United States Patent
Kalitin et al.

(10) Patent No.: US 10,375,056 B2
(45) Date of Patent: Aug. 6, 2019

(54) PROVIDING A SECURE COMMUNICATION CHANNEL DURING ACTIVE DIRECTORY DISASTER RECOVERY

(71) Applicant: Quest Software Inc., Aliso Viejo, CA (US)

(72) Inventors: Sergey Alexandrovich Kalitin, St. Petersburg (RU); Sergey Romanovich Vartanov, St. Petersburg (RU)

(73) Assignee: Quest Software Inc., Aliso Viejo, CA (US)

(*) Notice: Subject to any disclaimer, the term of this patent is extended or adjusted under 35 U.S.C. 154(b) by 168 days.

(21) Appl. No.: 15/291,886

(22) Filed: Oct. 12, 2016

(65) Prior Publication Data
US 2018/0103033 A1    Apr. 12, 2018

(51) Int. Cl.
*H04L 29/06* (2006.01)
*G06F 11/14* (2006.01)
*H04L 29/14* (2006.01)

(52) U.S. Cl.
CPC ...... *H04L 63/0823* (2013.01); *G06F 11/1464* (2013.01); *H04L 69/40* (2013.01); *G06F 2201/84* (2013.01)

(58) Field of Classification Search
CPC ..... H04L 9/3263; H04L 9/3268; H04L 9/007; H04L 67/02; H04L 67/42; H04L 67/2861; H04L 29/08846; H04L 63/10; H04L 63/0823; H04L 63/105; H04L 41/00; G06F 9/4486; G06F 9/44521; G06F 21/10; G06F 21/125; G06F 20/12; G06F 3/0601

USPC ............................................. 726/10; 713/156
See application file for complete search history.

(56) References Cited

U.S. PATENT DOCUMENTS 6,141,698 A * 10/2000 Krishnan ............ G06F 9/44521
                                                            719/331
8,707,043 B2 * 4/2014 Wason ................. H04L 9/3273
                                                            380/229
9,319,452 B2 * 4/2016 Kaushik ............... H04L 63/105
(Continued)

OTHER PUBLICATIONS

"Active Directory Service Interfaces (Windows)—MSDN—Microsoft" https://msdn.microsoft.com/en-us/library/aa772170(v=vs.85).aspx, 2011. Web. May 14, 2018.*
(Continued)

*Primary Examiner* — Farid Homayounmehr
*Assistant Examiner* — Raied A Salman
(74) *Attorney, Agent, or Firm* — Kirton McConkie; Brian Tucker

(57) ABSTRACT

A secure communication channel can be established between a recovery console and a recovery agent during an Active Directory disaster recovery. This secure channel can be established without employing the Kerberos or NT LAN Manager (NTLM) authentication protocols. Therefore, the recovery console and recovery agent will be able to establish a secure channel even when the domain controller is in Directory Services Restore Mode (DSRM) and NTLM is disabled. A secure channel can be established between the recovery console and the recovery agent based on the Microsoft Secure Channel (Schanel) Security Support Provider (SSP). The Schannel implementation can be modified in a manner that allows the client to be authenticated within the Schannel architecture.

20 Claims, 16 Drawing Sheets

(56) References Cited

U.S. PATENT DOCUMENTS

| | | | | |
|---|---|---|---|---|
| 2004/0019806 A1* | 1/2004 | Beyh | .................. | H04L 63/0428 726/14 |
| 2006/0161981 A1* | 7/2006 | Sheth | .................... | G06F 9/4486 726/22 |
| 2008/0072039 A1* | 3/2008 | Relyea | ................. | H04L 9/3263 713/158 |
| 2013/0291086 A1* | 10/2013 | Pontillo | .............. | H04L 63/0823 726/10 |
| 2014/0101439 A1* | 4/2014 | Pettigrew | .............. | H04L 9/3268 713/156 |

OTHER PUBLICATIONS

"Library (Windows)—MSDN—Microsoft" https://msdn.microsoft.com/en-us/library/windows/desktop/ms721633(v=vs.85).aspx#_security_virtual_store_gly, 2011. Web. May 14, 2018.*

"802.1x EAP-TLS with Binary Certificate Comparison from AD and NAM Profiles Configuration Example" https://www.cisco.com/c/en/us/support/docs/lan-switching/8021x/116018-config-8021-00.html, Apr 9, 2013. Web. May 14, 2018.*

"Kerberizing Applications Using Security Support Provider Interface", Jalal Feghhi and Jalil Feghhi, http://www.informit.com/articles/article.aspx?p=20989&segNum=3, Mar. 30, 2001. Web. May 14, 2018.*

"Search Results TLS—SSL (Schannel SSP) Overview | Microsoft Docs" https://docs.microsoft.com/en-us/windows-server/security/tls/tls-ssl-schannel-ssp-overview, Oct. 12, 2016. Web. May 14, 2018.*

MSDN—Microsoft, MSDN, "Active Directory Service Interfaces", Jul. 2017, https://msdn.microsoft.com/en-us/library/aa772170(v=vs.85). aspx, pp. 1-2.*

MSDN—Microsoft, "virtual store", Oct. 2017, https://msdn.microsoft.com/en-us/library/windows/desktop/ms721633(v=vs.85).aspx#_security_virtual_store_gly, pp. 1-2.*

Cisco, "802.1x EAP-TLS with Binary Certificate Comparison from AD and NAM Profiles Configuration Example", Apr. 2013, https://www.cisco.com/c/en/us/support/docs/lan-switching/8021x/116018-config-8021-00.html, pp. 1-14.* surama@microsoft.com, "Kerberos Authentication Problem with Active Directory", Apr. 2009, https://blogs.technet.microsoft.com/surama/2009/04/06/kerberos-authentication-problem-with-active-directory, pp. 1.*

Jalal Feghhi et al., "Kerberizing Applications Using Security Support Provider Interface", Mar. 30, 2001, http://www.informit.com/articles/article.aspx?p=20989&seqNum=3, pp. 1-17.*

* cited by examiner

PROVIDING A SECURE COMMUNICATION CHANNEL DURING ACTIVE DIRECTORY DISASTER RECOVERY

CROSS-REFERENCE TO RELATED APPLICATIONS

N/A

BACKGROUND

Dell Recovery Manager for Active Directory Forest Edition is a product that can be employed to recover an Active Directory forest or specific domains in the forest in response to corruption or improper modification to the forest. Recovery Manager can automate the various manual tasks involved in a recovery, remotely quarantine corrupt domain controllers, and restore domain controllers to speed up the overall recovery and restore business operation quickly.

The process of recovering an Active Directory forest can be extremely complicated. For example, Microsoft outlines over a dozen steps just to get a domain controller up and running. These steps include quarantining domains, seizing operations master roles, metadata cleanup, DNS configuration, and resetting many Active Directory account passwords, among many others that must be performed on each domain controller in the forest. If these steps are performed incorrectly or out of order, the recovery process may need to be restarted from the beginning.

Recovery Manager facilitates this recovery process by automating the various steps thereby ensuring that they are completed correctly and in order. To employ Recovery Manager or other Active Directory recovery solutions, it is typical to prepare a "disaster recovery plan" which defines the steps that the recovery solution should perform. Then, if a disaster occurs, Recovery Manager can execute the steps of the disaster recovery plan to quickly restore a domain or forest.

In an Active Directory environment, a domain controller functions to authenticate users and to enforce security policy within a domain. Key components of the domain controller are therefore the authentication mechanisms employed to provide these functions. Currently, a domain controller may typically implement the NTLM (NT LAN Manager) and/or Kerberos authentication protocols. As an overview, in a typical scenario, a user will enter his or her credentials on a client computer that is part of an Active Directory domain causing an authentication provider on the client computer to commence an exchange with the domain controller to thereby authenticate the user on the domain (as opposed to authenticating the user on a local account). This exchange may be carried out using NTLM or Kerberos. As part of this exchange, the client may receive a ticket/token (e.g., a Kerberos TGT (ticket-granting ticket)). Then, when the client attempts to access a service or resource within the domain, the client can present this ticket/token to the domain controller for validation again using NTLM or Kerberos. If the domain controller validates the ticket/token, the client will be allowed to access the desired service or resource. Accordingly, without a functioning domain controller, a user will be unable to login to a Windows system and will be unable to access services or resources within the domain.

During an Active Directory disaster (which may occur for various reasons such as when Active Directory objects are accidentally or intentionally deleted), these authentication mechanisms may not be operational. For example, when a disaster occurs, an administrator may oftentimes boot the failed domain controller (or more particularly, the server that was functioning as a domain controller) into the Directory Services Restore Mode (DSRM). In DSRM, Active Directory is not started on the server and the object database remains offline thereby allowing specific objects to be restored. When in DSRM, Kerberos is not available. Also, in many cases, NTLM is disabled on the domain controller for security reasons (e.g., because Kerberos provides stronger authentication than NTLM).

Recovery Manager employs a client/server architecture to protect domain controllers and to provide centralized backup/restore management as is represented in FIG. 1. In this client/server architecture, a recovery console 101 may be executed on any suitable computing device and a recovery agent 103 may be installed on each domain controller 102a-102d that is to be managed in the forest (i.e., on any domain controller that will be part of the disaster recovery plan). Although four domain controllers are depicted in FIG. 1, any number of domain controllers could be managed/protected by Recovery Manager. In the following description, any of these domain controllers can be generally referred to as domain controller 102.

Recovery agent 103 is tasked with performing various backup and restore operations and should therefore be accessible when the domain controller is in DSRM. An administrator can employ recovery console 101 to communicate with recovery agent 103 in the event of a disaster to perform any appropriate restore operations (e.g., resetting passwords, managing Flexible Single Master Operation (FSMO) roles, raising the relative ID (RID) pool, etc.). Recovery console 101 can also communicate with recovery agent 103 at other times. Typically, recovery console 101 and recovery agent 103 will be configured to communicate using Remote Procedure Call (RPC).

Since recovery agent 103 will be capable of performing administrative tasks on the domain controller, recovery console 101 and recovery agent 103 can be configured to authenticate prior to communicating. This will ensure that only an authorized user of recovery console 101 can communicate with recovery agent 103 (i.e., that recovery agent 103 will not be accessible to a malicious application). This will also allow recovery console 101 to verify that it is connecting to recovery agent 103 and not to an impersonating application.

Recovery console 101 and recovery agent 103 can typically be configured to employ the Microsoft Negotiate Security Support Provider (SSP) to perform mutual authentication. The Microsoft Negotiate SSP negotiates between using NTLM or Kerberos. Under normal conditions, one or both of NTLM and Kerberos will be available for authentication purposes. However, as mentioned above, when the domain controller is in DSRM, Kerberos will not be available. Therefore, if the domain controller has been configured to disable NTLM, no authentication mechanism will be available. In such scenarios, because recovery console 101 and recovery agent 103 are configured to require mutual authentication, they will be prevented from communicating.

BRIEF SUMMARY

The present invention extends to methods, systems, and computer program products for providing a secure communication channel during Active Directory disaster recovery. The techniques of the present invention can allow a recovery console and a recovery agent on a domain controller to establish a secure channel without employing the Kerberos or NTLM authentication protocols. Therefore, the recovery console and recovery agent will be able to establish a secure channel even when the domain controller is in DSRM and NTLM is disabled.

A secure channel can be established between the recovery console and the recovery agent based on the Microsoft Secure Channel (Schannel) SSP. RPC over Schannel does not provide a way for authenticating a client, but instead only performs authentication of the server. To address this issue, the present invention can modify the RPC over Schannel implementation in a manner that allows the client to be authenticated within the Schannel architecture. The present invention can also provide a way to store the recovery console's certificate in a collection certificate store on a domain controller even when the uploading of certificates is blocked for security reasons.

In one embodiment, the present invention can be implemented by a recovery agent as a method for establishing a secure connection between a recovery console and the recovery agent. The recovery agent can receive a console certificate from the recovery console and store it. The recovery agent can also install a hook on a function that is called by a security support provider to accept a certificate context received from a client. Then, the recovery agent can intercept a call to this function and verify a certificate context obtained from the intercepted call against the console certificate. When the certificate context is verified, the recovery agent can allow the call to complete, whereas when the certificate context is not verified, the recovery agent can cause the call to fail.

In another embodiment, the present invention is implemented between a recovery console and a recovery agent as a method for establishing a secure connection. The recovery console can send a console certificate to the recovery agent. The recovery agent can install a hook on a function that is called by a server-side security support provider to accept a certificate context received from a client. The recovery console can request that a client-side security support provider establish a secure connection between the recovery console and the recovery agent such that the client-side security support provider sends a security token containing a console certificate context to the server-side security support provider. In response to the server-side security support provider receiving the security token and calling the function, the recovery agent intercepts the call such that the recovery agent obtains access to the security token. The recovery agent can obtain the console certificate received from the recovery console and verify the console certificate context obtained from the security token against the console certificate. In another embodiment, the present invention is implemented as computer storage media storing computer executable instructions which implement a method for establishing a secure channel. This method can include the steps of: receiving, by a recovery agent executing on a domain controller, a console certificate from a recovery console; storing the console certificate on the domain controller; installing a hook on a function that is called by a security support provider to accept a certificate context received from a client; intercepting a call to the function; and verifying a certificate context obtained from the intercepted call against the console certificate such that when the certificate context is verified, the recovery agent allows the call to complete, whereas when the certificate context is not verified, the recovery agent causes the call to fail.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
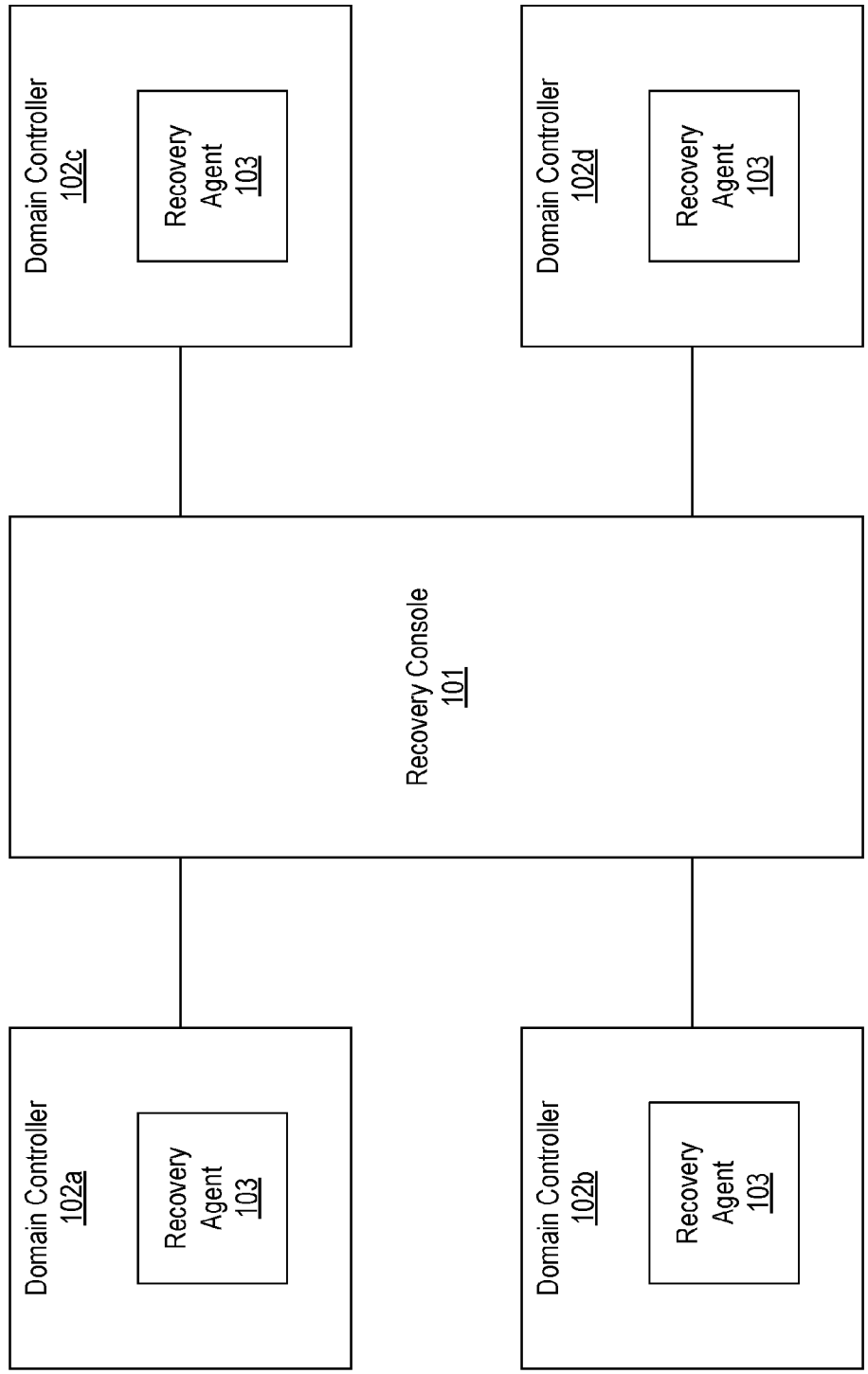
FIG. 1 illustrates an example computing environment in which the present invention can be implemented.

The Schannel authentication protocol is based on public key cryptography. When a client desires to communicate with a server, the client can employ the Schannel SSP (or simply "Schannel") to send a message to the server and the server will employ Schannel to respond with the information needed to authenticate itself. This information includes a certificate. The client-side Schannel can verify that the certificate is authentic and, if so, accept the certificate as proof of the identity of the server. The certificate includes the server's public key which the client can employ to encrypt further messages sent to the server.

In the context of the present invention, recovery agent 103 executes on the server and recovery console 101 executes on the client. Therefore, recovery console 101 could employ Schannel to request the certificate of recovery agent 103, verify it, and then securely communicate with recovery agent 103. When RPC is used to communicate, Schannel does not provide a way for recovery agent 103 to authenticate recovery console 101. In other words, if typical RPC over Schannel techniques are employed, any application would be able to communicate with recovery agent 103. The use of Schannel would therefore create a vulnerability by which a malicious application could access recovery agent 103 and therefore have the ability to restore the domain controller, reset passwords, manage FSMO roles, etc.

The present invention implements techniques to modify this typical RPC over Schannel functionality in a manner that will allow recovery agent 103 to authenticate recovery console 101. In this way, the security of recovery agent 103 can be ensured even when NTLM and Kerberos are not available such as when a domain controller is booted into DSRM. It is noted, however, that these techniques could be implemented at any time including when a domain controller is in normal operation mode.

FIGS. 2A-2G illustrate how the present invention can modify the Schannel functionality to allow recovery agent 103 to authenticate recovery console 101. Initially, when recovery console 101 desires to communicate with recovery agent 103, recovery console 101 can generate a console certificate 201*a* and an agent certificate 201*b* as represented by step 1. Recovery console 101 can create these certificates in any suitable manner such as by employing the certutil command line tool. In step 2*a*, recovery console 101 can send console certificate 201*a* to recovery agent 103 which can then store the certificate in storage 251. Similarly, in step 2*b*, recovery console 101 can store agent certificate 201*b* in storage 250. Storages 250 and 251 can generally represent any storage location on the respective devices. These certificates will be used later in the authentication process to overcome the lack of client authentication in RPC over Schannel.

In some cases, storages 250 and 251 may represent a trusted certificate store. However, in other cases, it may not be possible to place a certificate in a trusted certificate store. For example, a domain controller in DSRM may not allow a certificate to be added to the trusted root machine store. In these cases, storages 250 and 251 may represent some general storage location. In most scenarios, recovery console 101 will be executing on a system that does not restrict access to the trusted certificate store and therefore storage 250 may typically represent the trusted certificate store.

As a general overview, in the Schannel SSP architecture, the client and server applications can use a dynamic link library (Secur32.dll) to communicate with the Local Security Authority Subsystem Service (LSASS) to establish/update a security context that will be used to create a secure connection. This dynamic link library will invoke a number of functions calls during this process such as the AcquireCredentialsHandle( ), InitializeSecurityContext( ), and AcceptSecurityContext( ) functions.

As the client, recovery console 101 can initiate this process by invoking appropriate functions of Secur32.dll, including specifying the recovery console credentials, which will result in the client-side Schannel invoking the InitializeSecurityContext function. In response to this first invocation of InitializeSecurityContext, Schannel will generate a security token that includes console certificate context 201*a*1.

The client-side Schannel will then send this security token to the server-side Schannel. Upon receiving the security token, the server-side Schannel will call AcceptSecurityContext with the security token as input. This will build on the partial security context represented in the security token and then return a security token representing this security context. The security token returned from AcceptSecurityContext will include recovery agent 103's certificate context. The server-side Schannel can then send this security token to the client-side Schannel which will invoke the InitializeSecurityContext for a second time passing the security token received from the server-side Schannel. If this second call to InitializeSecurityContext succeeds, recovery agent 103 will have been authenticated and recovery console 101 can commence communicating securely with recovery agent 103 via the established Schannel connection.

In accordance with embodiments of the present invention, recovery console 101 can hook the InitializeSecurityContext function and recovery agent 103 can hook the AcceptSecurityContext function to enable recovery agent 103 to enable mutual authentication of recovery console 101 and recovery agent 103. In this way, recovery agent 103 can ensure that only recovery console 101 will be able to communicate with it.

Figure 2A:
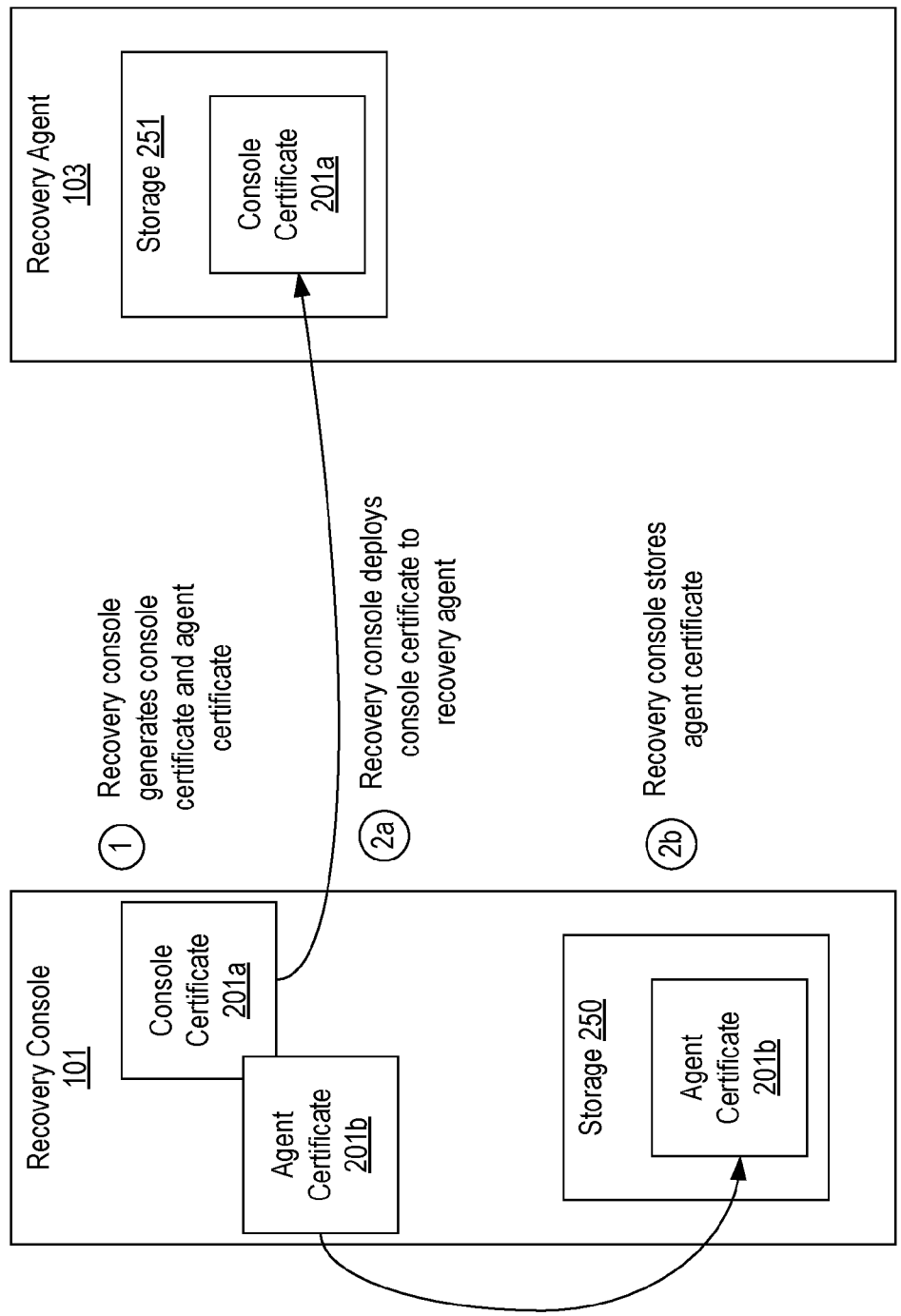
FIGS. 2A-2G illustrate a sequence a steps that can be performed by a recovery console and a recovery agent to modify the RPC over SChannel authentication process to thereby allow the recovery console to be authenticated.
Figure 2B:
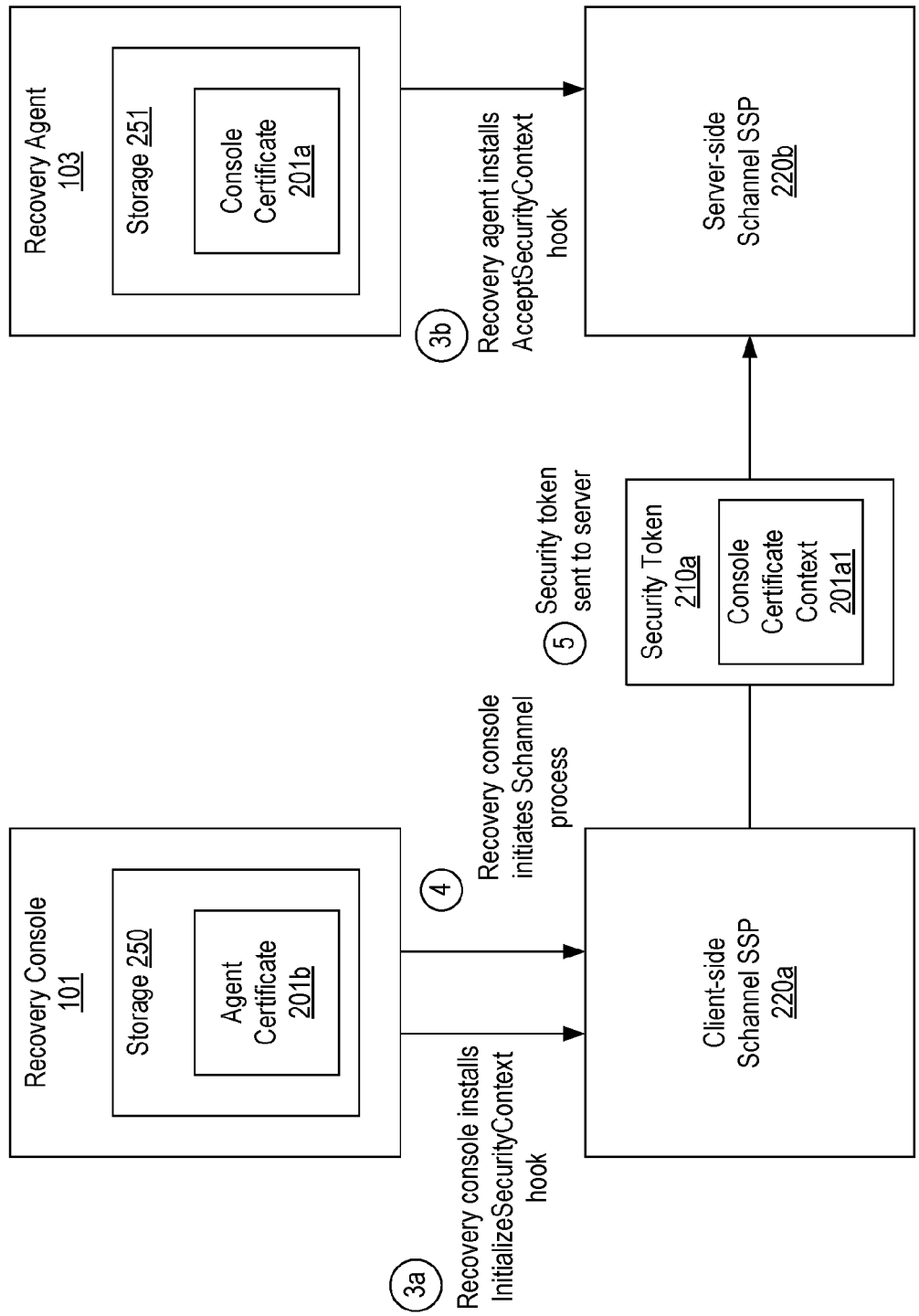
Figure 2C:
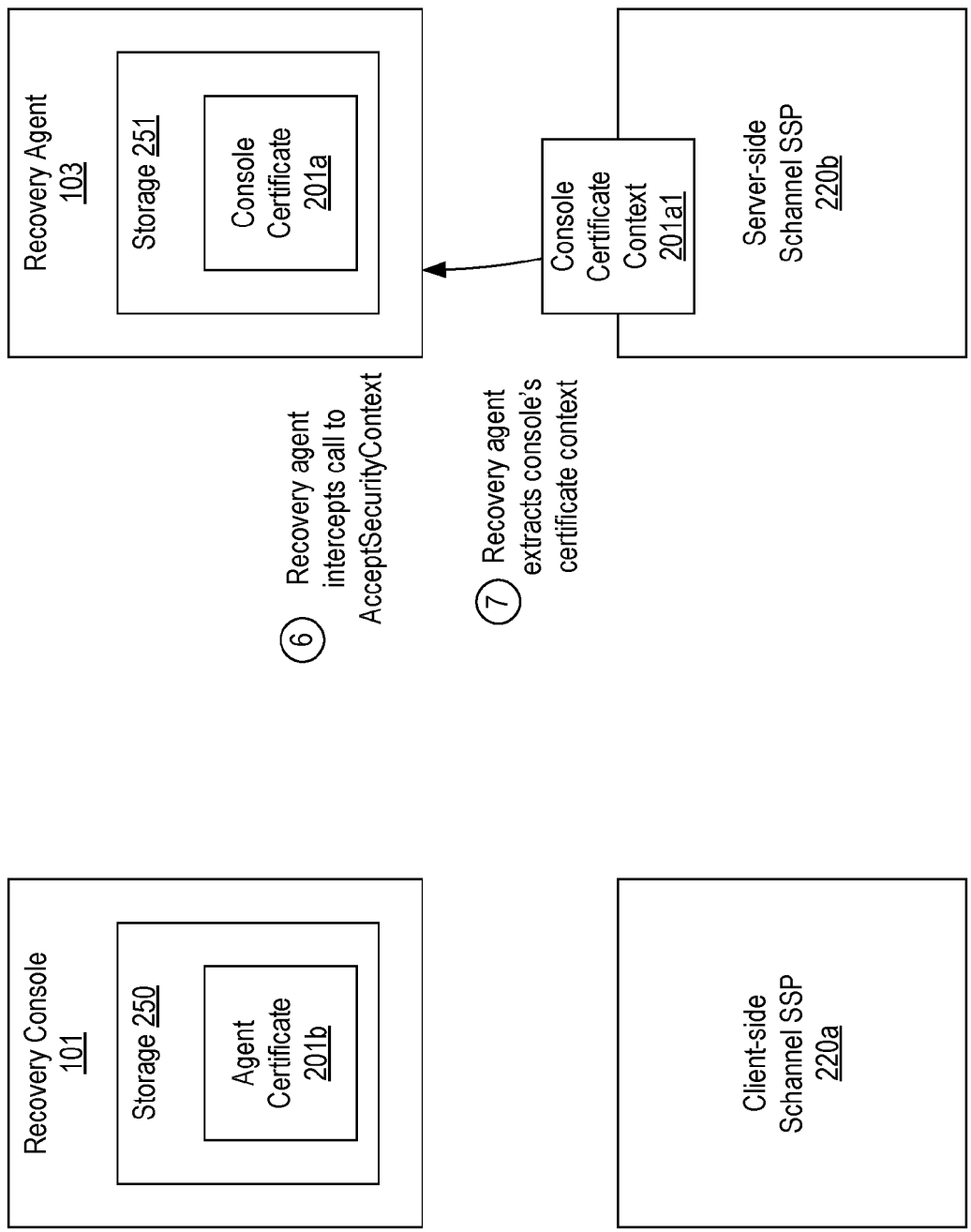

As shown in FIG. 2B, in steps 3*a* and 3*b*, recovery console 101 can hook the InitializeSecurityContext function and recovery agent 103 can hook the AcceptSecurityContext function. For example, recovery agent 103 could install its hook before it commences listening for connection requests, and recovery console 101 could install its hook before requesting a secure connection. Then, in step 4, recovery console 101 can invoke the process for establishing a secure Schannel connection with recovery agent 103. For example, step 4 could be performed when domain controller 102 is in DSRM as part of performing a disaster recovery.

As described above, when recovery console 101 initiates the Schannel authentication process, Schannel 220*a* will commence establishing a security context by acquiring the recovery console's credentials and passing these credentials as input to the InitializeSecurityContext function. Because of the hook, recovery console 101 will intercept this call but may allow the call to proceed in a normal fashion at this point (i.e., because the credential input will identify recovery console 101's own certificate). Schannel 220*a* will therefore create a security token 210*a* that includes console certificate context 201*a*1 (which would have been created based on the credentials input to InitializeSecurityContext) and will send this security token 210*a* to server-side Schannel 220*b* in step 5.

As described above, upon receiving security token 210*a*, Schannel 220*b* will invoke the AcceptSecurityContext function with security token 210*a* as input. Because it has hooked this function, in step 6, recovery agent 103 will intercept this call to AcceptSecurityContext. Because the call to AcceptSecurityContext will include security token 210*a*, recovery agent 103 can extract console certificate context 201*a*1 from security token 210*a* in step 7.

Figure 2D:
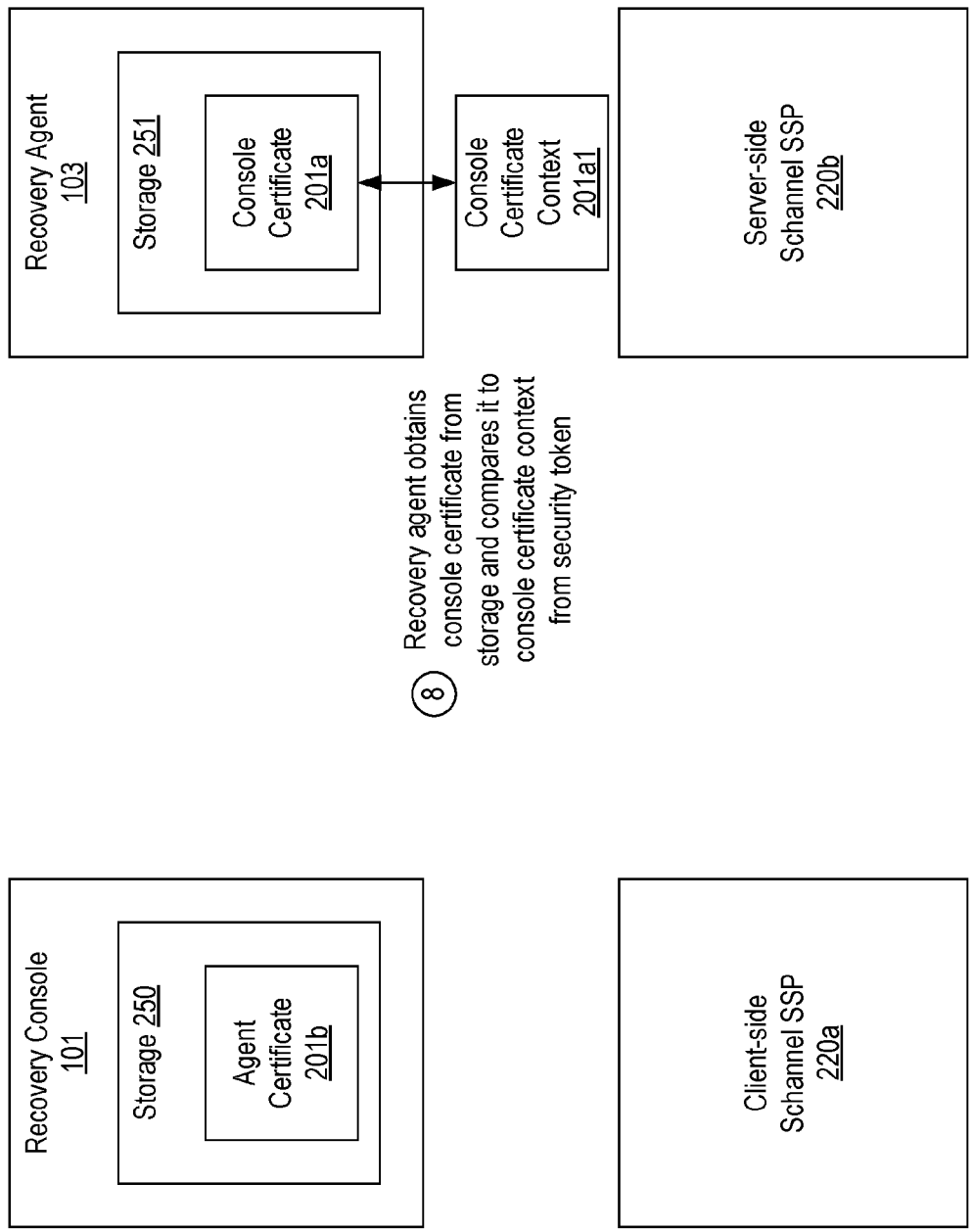

Next, in step 8 shown in FIG. 2D, recovery agent 103 can obtain console certificate 201*a* from storage 251 and compare it to console certificate context 201*a*1. In some embodiments, such as when storage 251 is not a certificate store, this comparison can be performed as a binary comparison. In other embodiments, if storage 251 is the trusted certificate store (which implies that recovery agent 103 was not prevented from adding console certificate 201*a* to the trusted certificate store), recovery agent 103 can employ the appropriate APIs to validate the certificate context. In further embodiments as will be described in detail below, even when recovery agent 103 may be prevented from adding a certificate to a trusted store, recovery agent 103 (and possibly recovery console 101) can employ a technique to store console certificate 201*a* in a virtual certificate store and then add the virtual certificate store to a collection certificate store so that the appropriate APIs can be used to validate the certificate context.

In this example, because recovery console is the source of security token 210*a*, the certificate context will match the stored certificate thereby authenticating recovery console 101 to recovery agent 103. Recovery agent 103 can therefore pass the AcceptSecurityContext call onto Schannel for normal handling. However, if the comparison/verification fails (which would be the case if an application other than recovery console 101 had sent a security token), recovery agent 103 can cause the call to fail thereby preventing a secure channel from being established.

Figure 2E:
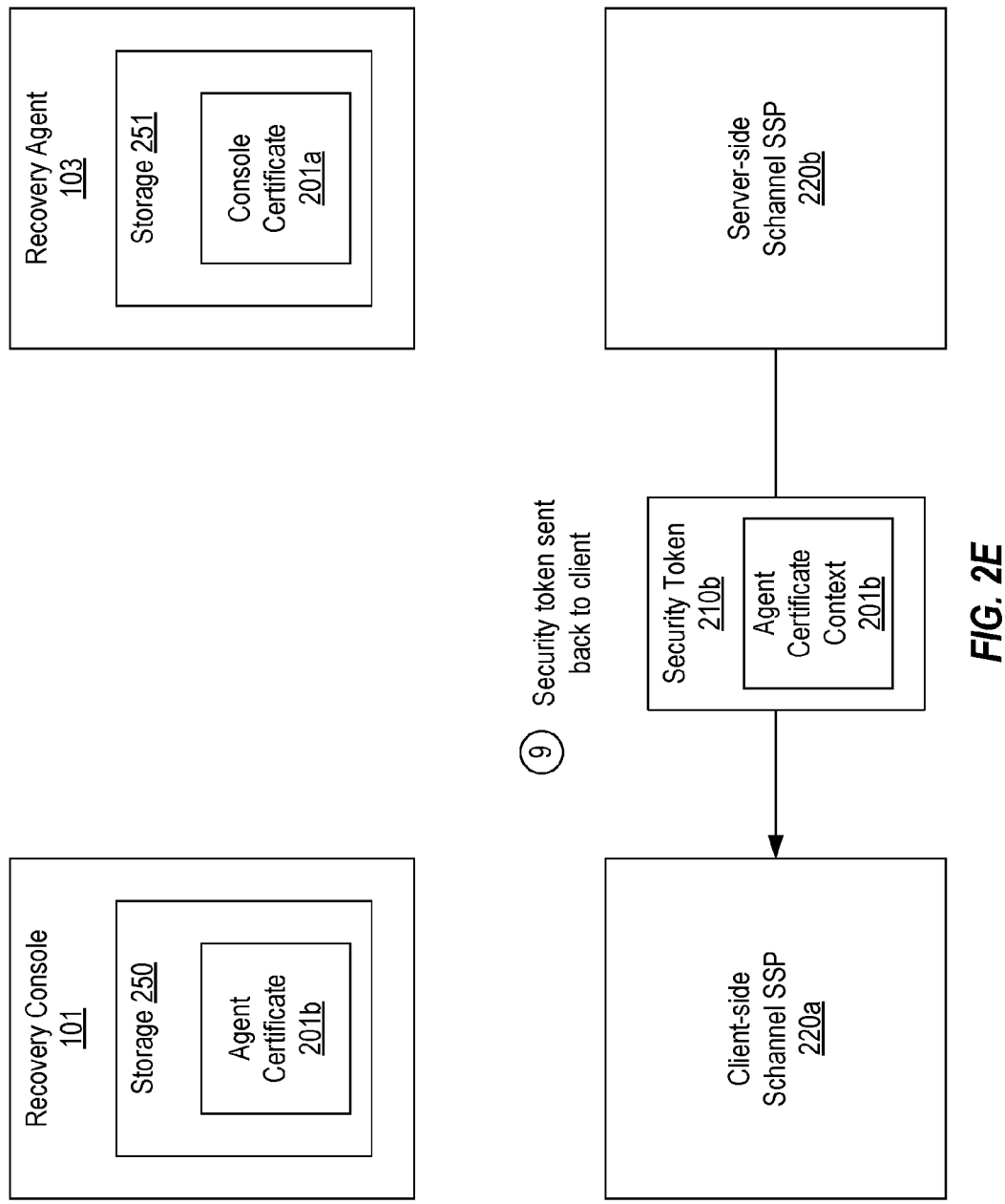
Figure 2F:
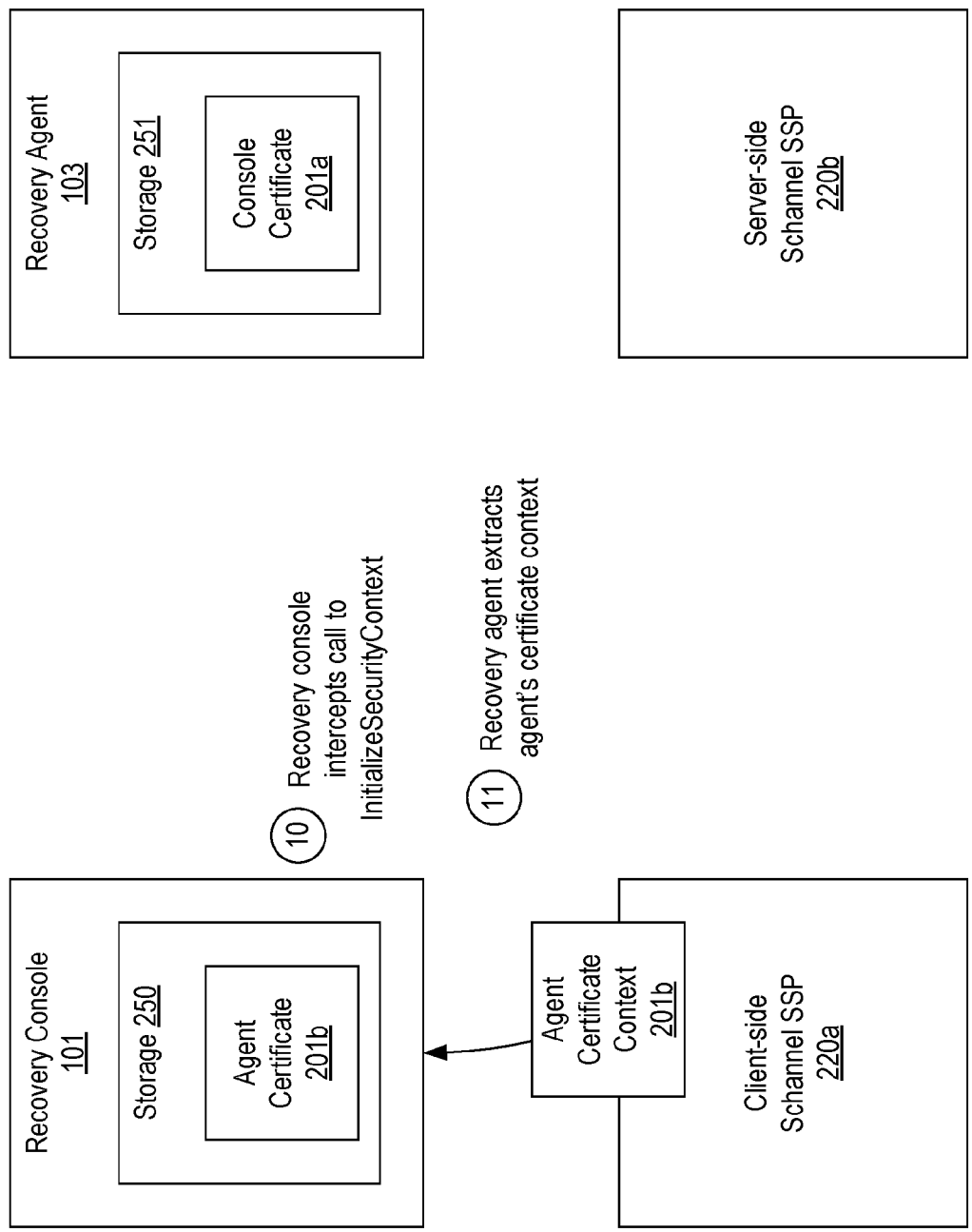

As explained above, AcceptSecurityContext will return security token 210*b* that includes agent certificate context 201*b*. Then, in step 9 as shown in FIG. 2E, Schannel 220*b* can send security token 210*b* to Schannel 220*a*. As shown in FIG. 2F, in response to receiving security token 210*b*, Schannel 220*a* will again call InitializeSecurityContext but with security token 210*b* as input for this second call. In step 10, recovery console 101 will intercept this call to InitializeSecurityContext and, in step 11, extract agent certificate context 201*b*1.

Figure 2G:
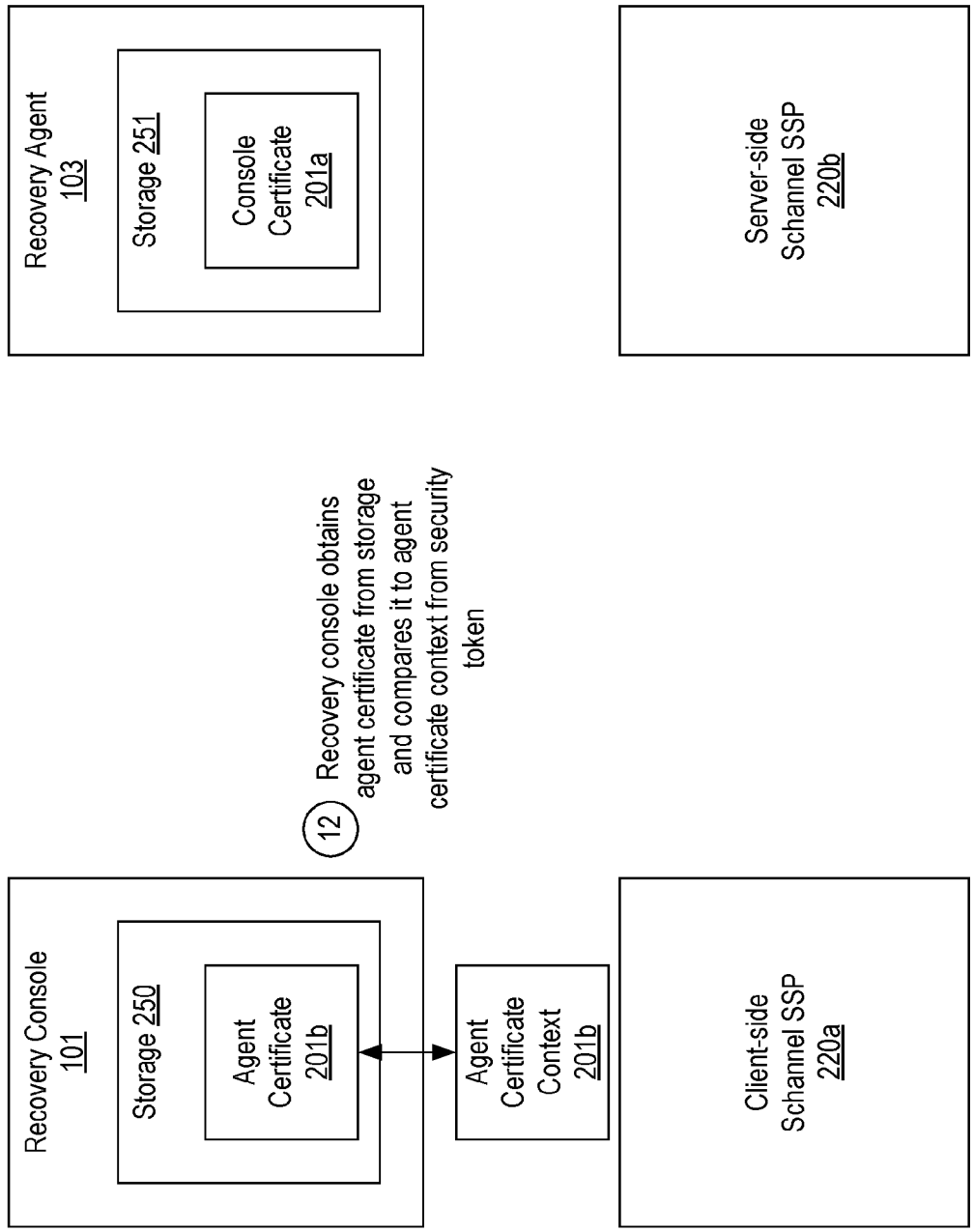

Finally, in step 12 as shown in FIG. 2G, recovery console 101 can obtain agent certificate 201*b* from storage 250 and compare it to agent certificate context 201*b*1. This comparison can be performed using any of the techniques mentioned above. In this case, because recovery agent 103 was the source of security token 210*b*, the context will match the certificate and recovery console 101 can pass the InitializeSecurityContext call onto Schannel for normal handling. In this way, Schannel will still establish a security context in a normal fashion to thereby allow recovery console 101 and recovery agent 103 to communicate via a secure channel. In contrast, if the certificate context does not match (which would be the case if recovery agent 103 was being spoofed), recovery console 101 can cause the call to fail thereby preventing a security context from being established.

Figure 3A:
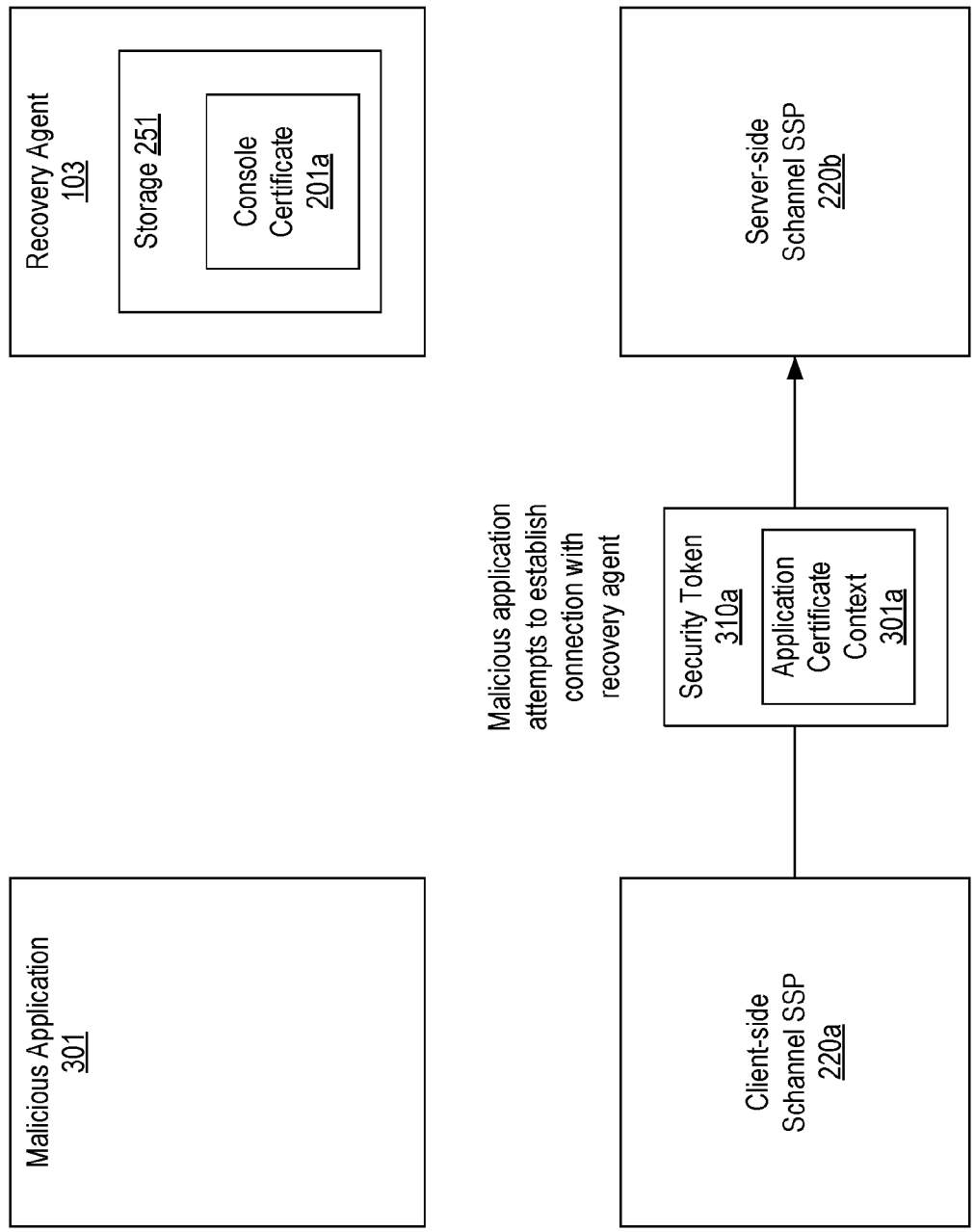
FIGS. 3A and 3B illustrate how the present invention will prevent an unauthorized client from establishing a secure connection with the recovery agent using Schannel.
Figure 3B:
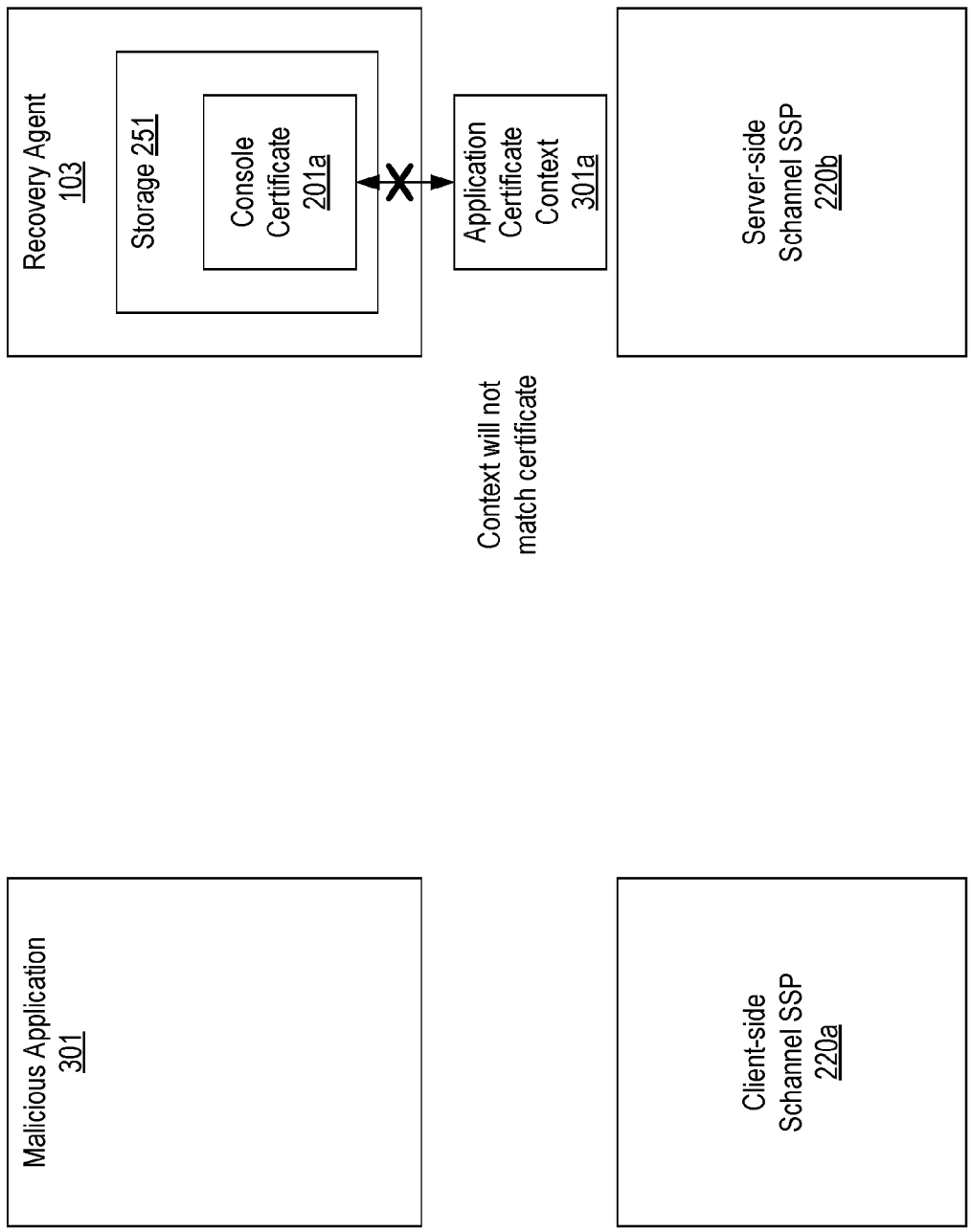

To better illustrate how this processing can assure that only recovery console 101 can access recovery agent 103, FIGS. 3A and 3B are provided. In FIG. 3A, it is assumed that recovery console 101 has already sent console certificate 201*a* to recovery agent 103. In this scenario, security token 310*a* would include the malicious application's certificate context (application certificate context 301*a*) or no certificate context at all. In either case, recovery agent 103 would intercept the call to AcceptSecurityContext and extract application certificate context 301*a* (or determine that no certificate context is included in the security token). Recovery agent 103 could then compare application certificate context 301*a*1 to console certificate 201*a* (which was previously deployed by recovery console 101). This comparison would fail as indicated in FIG. 3B thereby notifying recovery agent 103 that the source of the security token is not recovery console 101. Recovery agent 103 would therefore prevent a secure channel from being created between recovery agent 103 and malicious application 301 (e.g., by causing the call to AcceptSecurityContext to fail).

As was introduced above, there may be scenarios where the domain controller's operating system will not allow certificates to be added to a trusted certificate store such as when the domain controller is in DSRM or when security limits are otherwise in place. In such scenarios, recovery agent 103 may store console certificate 201*a* in general storage and use a binary comparison to authenticate recovery console 101. Recovery console 101 may also do this with agent certificate 201*b* if the same limitations were present on the recovery console's system. This type of binary comparison, however, will not account for various certificate specific metadata (e.g., expiry date) that would otherwise be validated if the certificate had been stored in the trusted certificate store and the appropriate verification APIs had been used to perform the verification. In short, a binary comparison will provide a weaker form of authentication.

To address this issue, the present invention can provide a way for recovery agent 103 (and possibly recovery console 101) to add console certificate 201*a* to a virtual certificate store and then add the virtual certificate store to the collection certificate store so that the certificate store verification APIs can be employed to authenticate recovery console 101. This is accomplished by hooking the CertOpenStore function (e.g., by using the CryptGetOIDFunctionAddress and CryptInstallOIDFunctionAddress API calls).

Figure 4A:
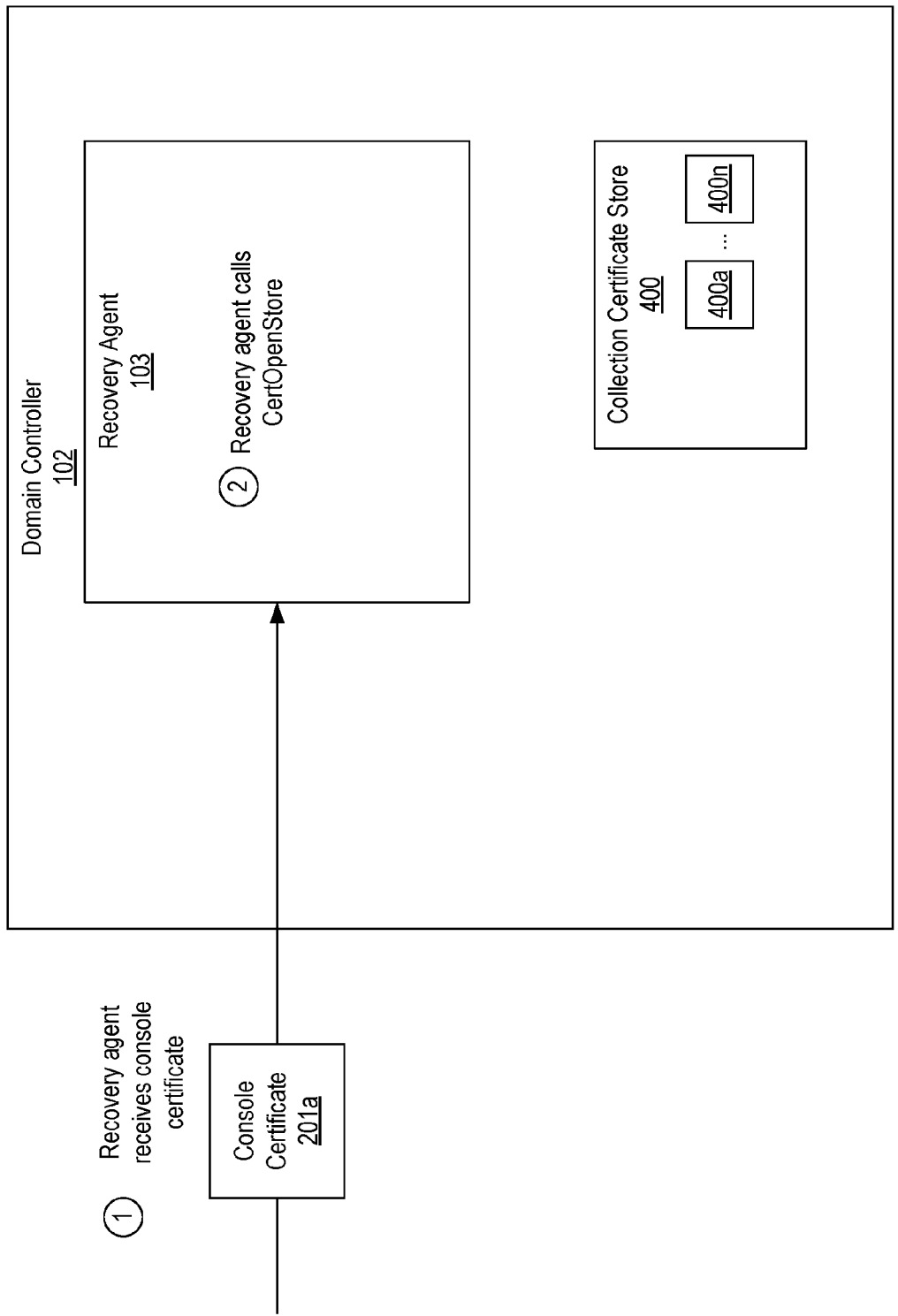
FIGS. 4A-4E illustrate a sequence of steps that can be performed to add a console certificate to a collection certificate store.

FIGS. 4A-4E illustrate how recovery agent 103 can handle intercepted calls to CertOpenStore. In FIG. 4A, it is assumed that recovery agent 103 has already installed the CertOpenStore hook and will therefore be able to handle any call to this function. Also, FIG. 4A shows that domain controller 102 includes a collection certificate store (or system store) 400 which comprises one or more certificate stores 400*a*-400*n*. For example, in Windows systems, collection certificate store 400 is typically predefined to include the MY, Root, Trust, and CA stores. As indicated above, in some scenarios, recovery agent 103 will not be allowed to add a certificate to any of the stores included in collection certificate store 400.

In step 1, recovery agent 103 receives console certificate 201*a*. Step 1 therefore corresponds with step 2*a* in FIG. 2A. Upon receiving console certificate 201*a*, recovery agent 103 can call the CertOpenStore function in step 2. Recovery agent 103 can use the CERT_STORE_PROV_MEMORY input parameter of the CertOpenStore function to specify that a certificate store should be created in memory.

Figure 4B:
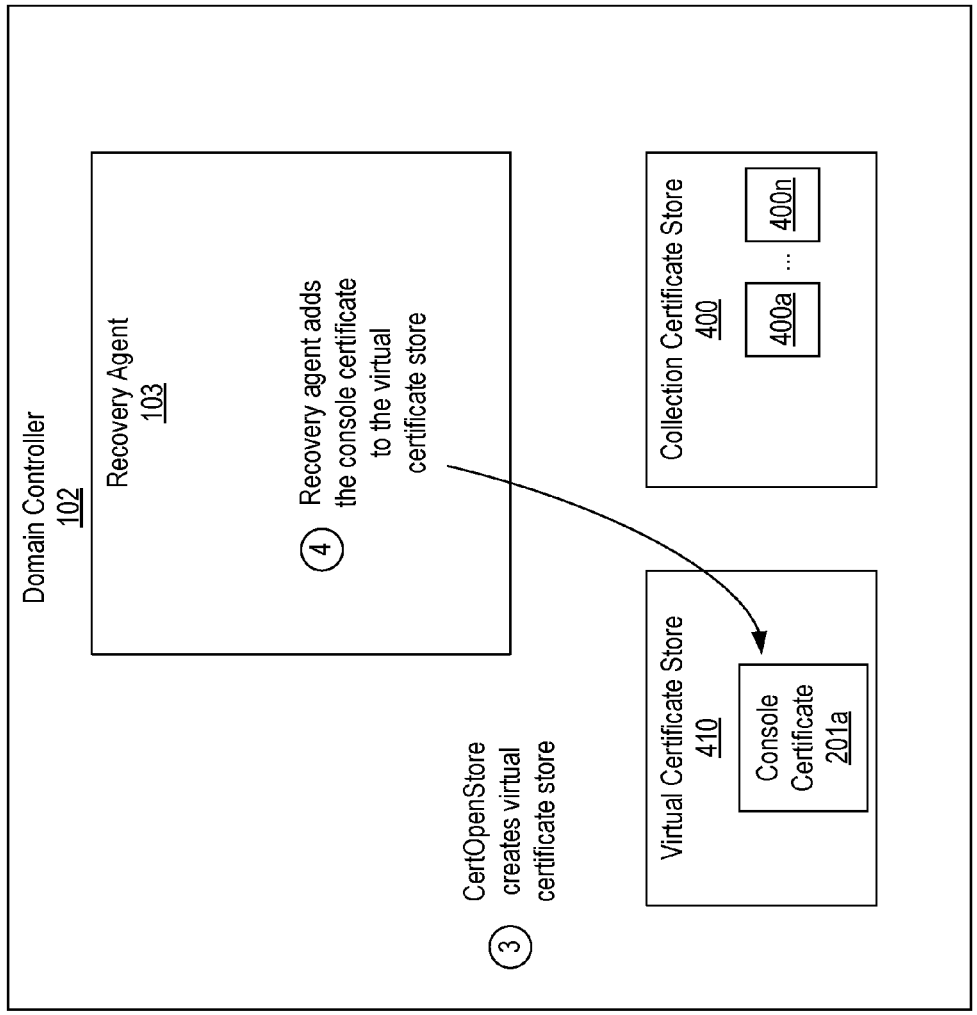

As shown in FIG. 4B, this call to CertOpenStore causes the operating system to create virtual certificate store 410 in memory in step 3. Because of the hook, recovery agent 103 will intercept this call but can allow the call to be handled in a normal fashion. In particular, because CertOpenStore is being invoked with the CERT_STORE_PROV_MEMORY parameter, recovery agent 103 can allow it to be handled in a normal fashion. Alternatively, recovery agent 103 could be configured to install the hook after this initial call to create virtual certificate store 410. In any case, once virtual certificate store 410 is created, recovery agent 103 can add console certificate 201*a* to virtual certificate store 410 in step 4 (e.g., by calling CertAddCertificateContextToStore).

Figure 4C:
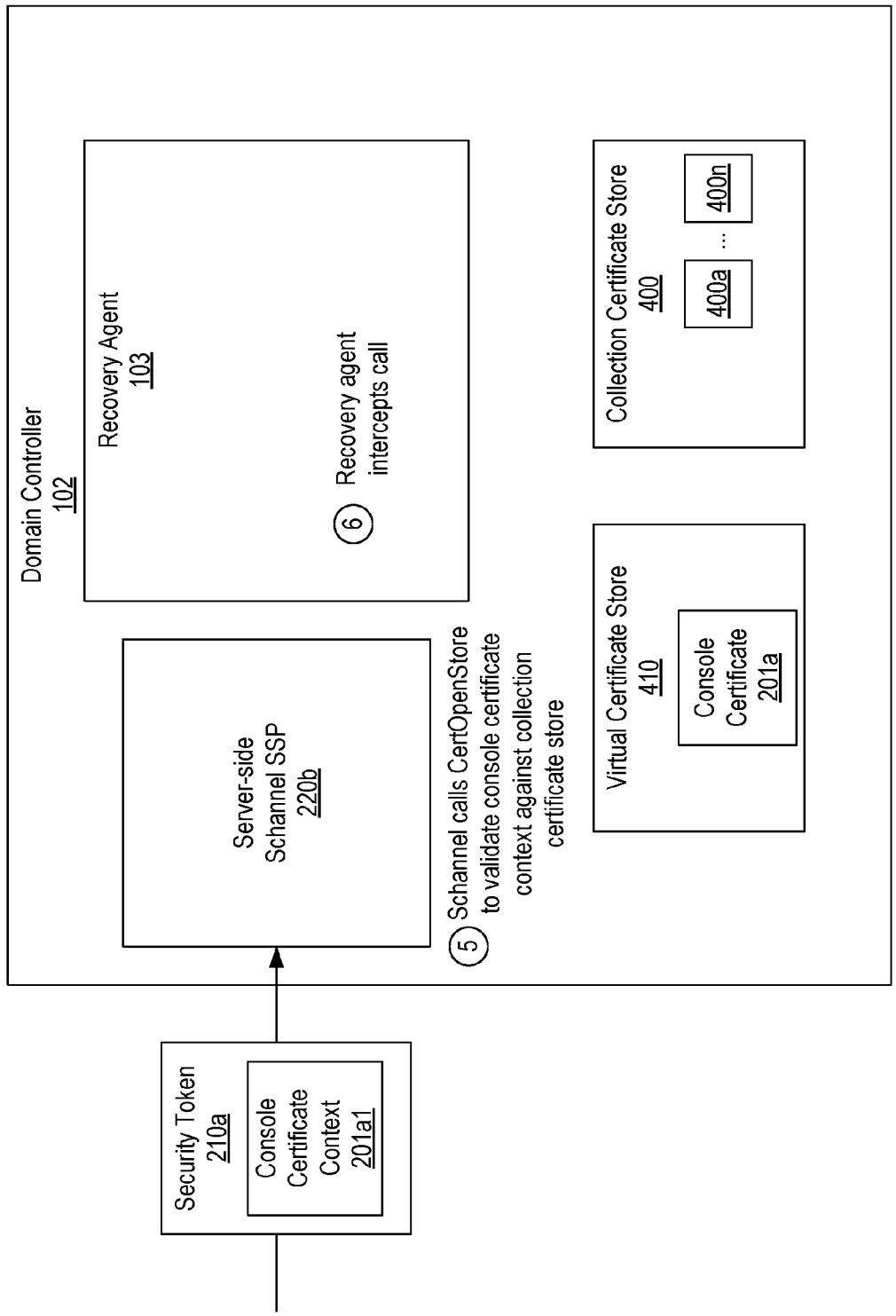

Next, in FIG. 4C, when recovery console 101 attempts to establish a secure connection with recovery agent 103, Schannel 220*b* will receive security token 210*a* as described above. In these scenarios, recovery agent 103 may still intercept the call to AcceptSecurityContext and perform the binary verification described above. Additionally, as part of handling the AcceptSecurityContext call, in step 5, Schannel 220*b* can call CertOpenStore in an attempt to verify console certificate context 201*a*1 that was included in security token 210*a*. In contrast to the call above, this call to CertOpenStore can specify the CERT_STORE_PROV_COLLECTION input parameter thereby indicating that collection certificate store 400 should be opened. Because of the hook, recovery agent 103 will intercept this call in step 6.

Figure 4D:
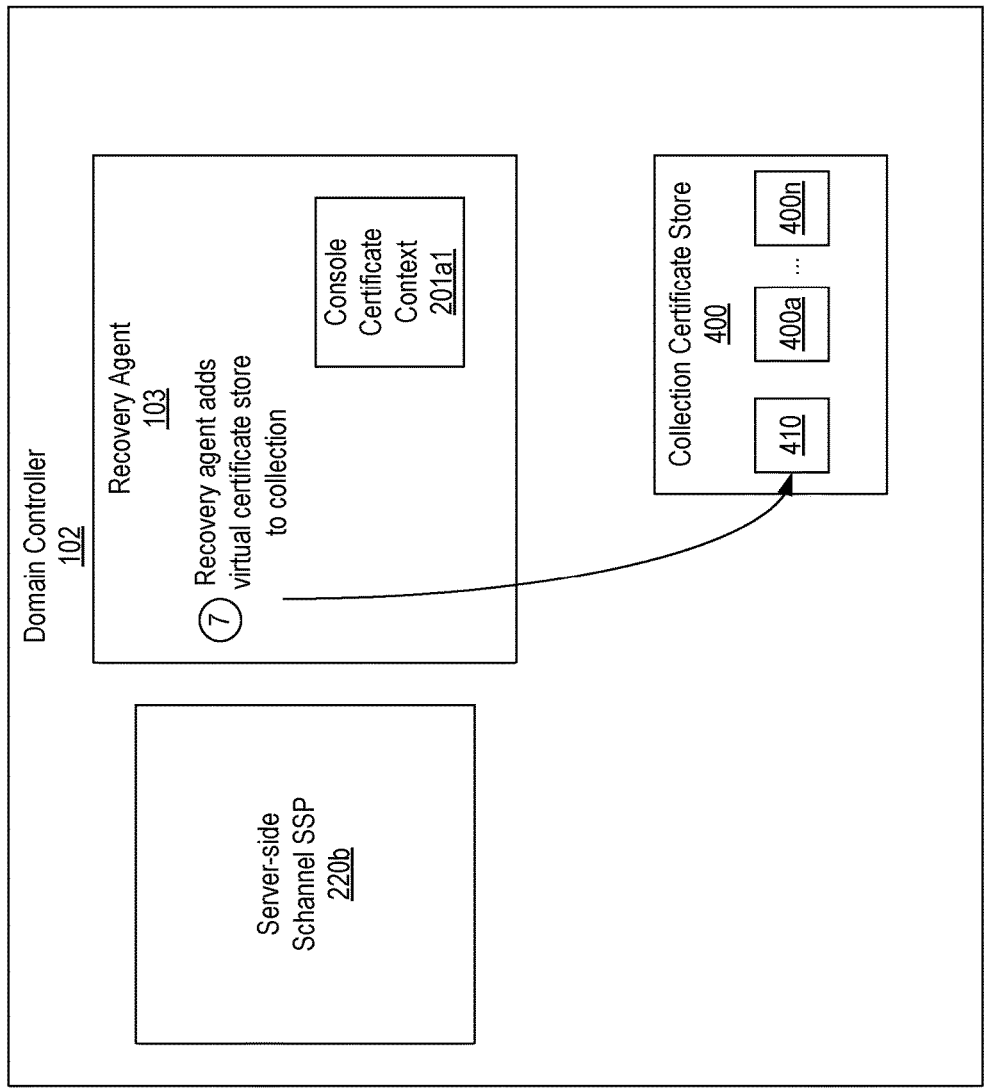

In step 7, as shown in FIG. 4D, when recovery agent 103 intercepts this call to open collection certificate store 400, it can add virtual certificate store 410, which includes console certificate 201*a*, to collection certificate store 400. This can be accomplished by calling CertAddStoreToCollection. The call to CertOpenStore can then be passed on for normal handling which will cause collection certificate store 400, which will now include virtual collection store 410, to be opened.

Figure 4E:
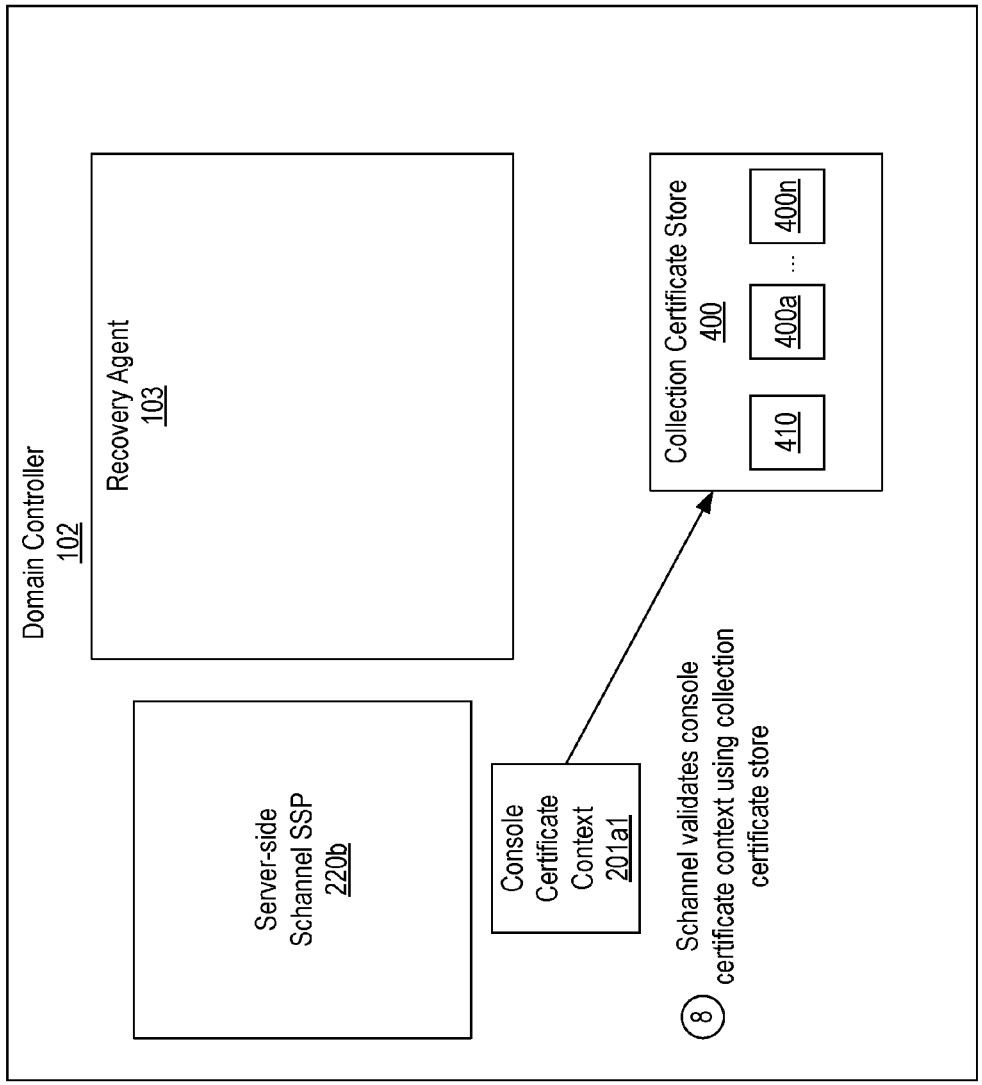

Finally, in step 8 as shown in FIG. 4E, because console certificate 201*a* has now been added to collection certificate store 400, when Schannel 220*b* attempts to verify console certificate context 201*a*1 against the collection 400 of trusted stores, the verification will succeed. The verification that is performed when a certificate is stored in a trusted store is stronger than the binary comparison verification that recovery agent 103 would otherwise be limited to. Therefore, this technique enhances the overall security of the system.

In summary, the steps illustrated in FIGS. 4A-4E represent one possible way in which recovery agent 103 can verify a certificate context received in an Schannel security token to thereby authenticate the client that is attempting to establish a secure connection. These steps therefore generally correspond to (or replace) step 7 in FIG. 2D. Although these steps have only been described on the recovery agent's side of the connection, they could equally be employed on the recovery console's side.

Figure 5:
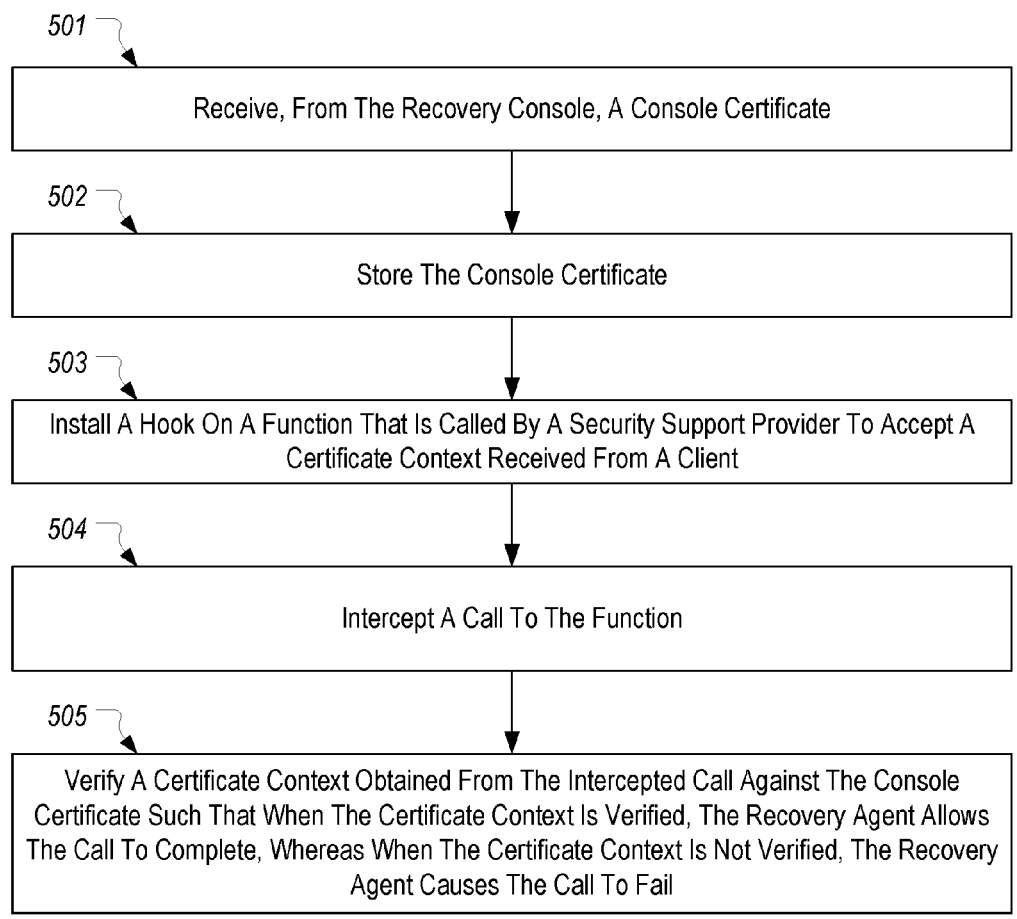
FIG. 5 illustrates a flowchart of an example method for establishing a secure channel between a recovery console and a recovery agent.

FIG. 5 illustrates a flowchart of an example method 500 for establishing a secure connection between a recovery console and the recovery agent. Method 500 can be performed by recovery agent 103 and may be performed when authentication via Kerberos and/or NTLM are not available.

Method 500 includes an act 501 of receiving, from the recovery console, a console certificate. For example, recovery agent 103 can receive console certificate 201a from recovery console 101.

Method 500 includes an act 502 of storing the console certificate. For example, recovery agent 103 could store console certificate 201a in a general storage location, in a trusted certificate store, or in a temporary, virtual certificate store.

Method 500 can include an act 503 of installing a hook on a function that is called by a security support provider to accept a certificate context received from a client. For example, recovery agent 103 can intercept a call to the AcceptSecurityContext function that is made when a security token is received from a client.

Method 500 includes an act 504 of intercepting a call to the function. For example, recovery agent 103 could hook the AcceptSecurityContext function so that it intercepts any calls to this function.

Method 500 includes an act 505 of verifying a certificate context obtained from the intercepted call against the console certificate such that when the certificate context is verified, the recovery agent allows the call to complete, whereas when the certificate context is not verified, the recovery agent causes the call to fail. For example, recovery agent 103 can verify that console certificate context 201a1 matches console certificate 201a by doing a binary comparison, or, if console certificate 201a has been included in collection certificate store 400, by calling appropriate APIs.

In summary, the present invention provides a way for a recovery console and recovery agent to perform mutual authentication using Schannel. In this way, a secure communication channel can be established even when other authentication mechanisms are not available as would be the case when a domain controller is booted into DSRM. The present invention also provides a way to include a virtual certificate store in a collection of trusted certificate stores so that a certificate context can be verified against a certificate stored in the virtual certificate store. This will enable enhanced verification even in cases where the operating system prevents certificates from being uploaded to a trusted certificate store.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a recovery agent executing on a server, for establishing a secure connection between a recovery console executing on a client and the recovery agent, the method comprising:
   receiving, from the recovery console, a console certificate;
   storing the console certificate to enable the recovery agent to access the console certificate during subsequent attempts to establish a secure connection with the recovery agent;
   installing a hook on a function that is called by a security support provider to accept a certificate context received from a client;
   intercepting a call to the function that is made as part of a particular client's attempt to establish a secure connection with the recovery agent; and
   as part of intercepting the call, verifying a certificate context obtained from the intercepted call against the console certificate that was previously received from the recovery console and stored, wherein when the certificate context is verified, the recovery agent allows the intercepted call to complete, whereas when the certificate context is not verified, the recovery agent causes the intercepted call to fail.

2. The method of claim 1, wherein the function is the AcceptSecurityContext function.

3. The method of claim 1, wherein the console certificate is not stored in a trusted certificate store, and wherein verifying the certificate context against the console certificate comprises performing a binary comparison.

4. The method of claim 1, wherein the server is a domain controller and the method is performed while the domain controller is in Directory Services Restore Mode.

5. The method of claim 1, wherein the server is a domain controller and the method is performed when Kerberos authentication is not available.

6. The method of claim 1, wherein the console certificate is stored in a virtual certificate store.

7. The method of claim 6, further comprising:
intercepting a call to a function to open a collection certificate store;
adding the virtual certificate store to the collection certificate store.

8. The method of claim 7, wherein the function to open the collection certificate store is the CertOpenStore function.

9. The method of claim 7, wherein verifying the certificate context against the console certificate comprises verifying the certificate context against the console certificate that is included in the collection certificate store.

10. The method of claim 1, wherein the security support provider is Schannel.

11. A method for establishing a secure connection between a recovery console executing on a client and a recovery agent executing on a server, the method comprising:
sending, by the recovery console, a console certificate to the recovery agent;
storing, by the recovery agent, the console certificate to enable the recovery agent to access the console certificate during subsequent attempts to establish a secure connection with the recovery agent;
installing, by the recovery agent, a hook on a first function that is called by a server-side security support provider to accept a certificate context received from a client;
requesting, by the recovery console, that a client-side security support provider establish a secure connection between the recovery console and the recovery agent thereby causing the client-side security support provider to send a security token containing a console certificate context to the server-side security support provider;
in response to the server-side security support provider receiving the security token and calling the first function, intercepting, by the recovery agent, the call to thereby obtain access to the security token;
accessing, by the recovery agent, the stored console certificate received from the recovery console; and
verifying, by the recovery agent, the console certificate context obtained from the security token against the stored console certificate.

12. The method of claim 11, further comprising:
installing, by the recovery console, a hook on a second function that is called by the client-side security support provider to accept a certificate context received from a server.

13. The method of claim 12, further comprising:
in response to the client-side security support provider receiving a security token containing an agent certificate context and calling the second function, intercepting, by the recovery console, the call such that the recovery console obtains access to the security token containing the agent certificate context;
obtaining, by the recovery console, an agent certificate stored on the client; and
verifying, by the recovery console, the agent certificate context obtained from the security token against the agent certificate.

14. The method of claim 11, wherein verifying the console certificate context against the console certificate comprises performing a binary comparison.

15. The method of claim 11, wherein the recovery agent stores the console certificate in a virtual certificate store, the method further comprising:
intercepting a call to a function to open a collection certificate store; and
adding the virtual certificate store to the collection certificate store.

16. The method of claim 11, wherein the recovery agent executes on a domain controller in an Active Directory environment.

17. The method of claim 11, wherein the security support provider is Schannel.

18. One or more non-transitory computer storage media storing computer executable instructions which implement a method for establishing a secure channel, the method comprising:
receiving, by a recovery agent executing on a domain controller, a console certificate from a recovery console executing on a client;
storing the console certificate on the domain controller to enable the recovery agent to access the console certificate during subsequent attempts to establish a secure connection with the recovery agent;
installing a hook on a function that is called by a security support provider to accept a certificate context received from a client;
intercepting a call to the function that is made as part of a particular client's attempt to establish a secure connection with the recovery agent; and
as part of intercepting the call, verifying a certificate context obtained from the intercepted call against the console certificate that was previously received from the recovery console and stored, wherein when the certificate context is verified, the recovery agent allows the intercepted call to complete, whereas when the certificate context is not verified, the recovery agent causes the intercepted call to fail.

19. The non-transitory computer storage media of claim 18, wherein verifying the certificate context against the console certificate comprises performing a binary comparison.

20. The non-transitory computer storage media of claim 18, further comprising:
storing the console certificate in a virtual certificate store;
intercepting a call to a function to open a collection certificate store; and
adding the virtual certificate store to the collection certificate store.

* * * * *